United States Patent
Moyer

(10) Patent No.: US 10,528,483 B2
(45) Date of Patent: Jan. 7, 2020

(54) HYBRID LOWER-LEVEL CACHE INCLUSION POLICY FOR CACHE HIERARCHY HAVING AT LEAST THREE CACHING LEVELS

(71) Applicant: ADVANCED MICRO DEVICES, INC., Sunnyvale, CA (US)

(72) Inventor: Paul Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/790,743

(22) Filed: Oct. 23, 2017

(65) Prior Publication Data
US 2019/0121748 A1    Apr. 25, 2019

(51) Int. Cl.
G06F 12/0811   (2016.01)
G06F 12/0895   (2016.01)
G06F 12/128    (2016.01)

(52) U.S. Cl.
CPC ........ *G06F 12/128* (2013.01); *G06F 12/0811* (2013.01); *G06F 12/0895* (2013.01); *G06F 2212/283* (2013.01); *G06F 2212/621* (2013.01)

(58) Field of Classification Search
CPC .............. G06F 12/0811; G06F 12/0895; G06F 12/128; G06F 2212/283; G06F 2212/621
See application file for complete search history.

(56) References Cited

U.S. PATENT DOCUMENTS

| | | |
|---|---|---|
| 2007/0239938 A1 | 10/2007 | Pong |
| 2010/0235579 A1 | 9/2010 | Biles et al. |
| 2013/0111139 A1 | 5/2013 | Balakrishnan et al. |
| 2013/0346694 A1* | 12/2013 | Krick ................... G06F 12/0811 711/122 |
| 2014/0156932 A1* | 6/2014 | Dundas ................ G06F 12/0862 711/122 |
| 2015/0032964 A1 | 1/2015 | Habermann et al. |
| 2016/0085677 A1* | 3/2016 | Loh ...................... G06F 12/0815 711/143 |
| 2016/0357683 A1 | 12/2016 | Takeda et al. |
| 2017/0255557 A1* | 9/2017 | Robinson ............. G06F 12/0831 |
| 2017/0371786 A1* | 12/2017 | Srinivasan .......... G06F 12/0811 |
| 2018/0121353 A1* | 5/2018 | Gaur ..................... G06F 12/128 |

OTHER PUBLICATIONS

International Search Report and Written Opinion dated Dec. 7, 2018 for corresponding International Application No. PCT/US2018/047992, 14 pages.

* cited by examiner

*Primary Examiner* — Aracelis Ruiz

(57) ABSTRACT

A system includes one or more processor cores and a cache hierarchy. The cache hierarchy includes a first-level cache, a second-level cache, and a third-level cache. The cache hierarchy further includes cache hierarchy control logic configured to implement a caching policy in which each cacheline cached in the first-level cache has a copy of the cacheline cached in at least one of the second-level cache and the third-level cache. The caching policy further provides that an eviction of a cacheline from the second-level cache does not trigger an eviction of a copy of that cacheline from the first-level cache, and that an eviction of a cacheline from the third-level cache triggers the cache hierarchy control logic to evict a copy of that cacheline from the first-level cache when the cacheline is not present in the second-level cache.

22 Claims, 4 Drawing Sheets

HYBRID LOWER-LEVEL CACHE INCLUSION POLICY FOR CACHE HIERARCHY HAVING AT LEAST THREE CACHING LEVELS

BACKGROUND

Processing systems often utilize a cache hierarchy having multiple levels of caches available for access by one or more processor cores. For cache hierarchies with three or more cache levels, one of three caching policies is required in conventional processing systems with respect to data for an address cached at the highest-level cache (e.g., an L1 cache): (1) the data is not required to be copied or included in any other cache; (2) a copy of the data is required to always be included in the second-highest-level cache (e.g., the L2 cache), and upon eviction of the copy of the cached data from the second-highest-level cache, an invalidation message is sent to evict the cached data from the highest level cache as well; or (3) a copy of the data is required to always be included in the third-highest-level cache (e.g., the L3 cache), and upon eviction from the third-highest-level cache, an invalidation message is sent to evict the cached data from the highest-level cache as well. The first policy is problematic in that by not requiring a copy of cached data in any other cache level, the cached data may be inaccessible to a component that does not have access to that highest-level cache, or the cached data's absence from the lower-level caches may cause excessive cache misses before the cached data is found and accessed, thereby impacting system performance. The latter two policies are problematic in that they lead to excessive invalidation messaging and cache line evictions, which also negatively impact system performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate systems and methods for efficient data caching in a cache hierarchy having three or more cache levels. In accordance with some embodiments, the control logic of the various caches of the cache hierarchy operate together to implement a hybrid lower-level cache inclusion policy that ensures that cachelines cached at a highest-level cache have at least one copy elsewhere in the cache hierarchy while also providing for reduced inter-cache messaging and evictions than conventional caching policies. As described in greater detail herein, this caching policy, referred to herein as a "hybrid lower-level cache inclusion policy", implements at least the following three guidelines. First, a cacheline present in the first-level cache (e.g., a Level 1, or L1, cache) is required to be in at least one of a second-level cache (e.g., a Level 2, or L2, cache) or a third-level cache (e.g., a Level 3, or L3, cache). Second, a cacheline evicted from the second-level cache does not require eviction of the same cacheline from the first-level cache. Third, eviction of a cacheline from the third-level cache requires eviction of the cacheline from the first-level cache if the cacheline is not also present in the second-level cache. This can be advantageous in that if the system is already searching in the second level cache and the third level cache to access to a cacheline, the caching policy described above results in the system being guaranteed to know if the sought-after cacheline is in the first level cache as well. Note that reference to a cacheline being "present" in a cache, as found herein, is reference to a copy being both stored at the cache and having a valid status at that cache. Thus, a copy of a cacheline that is marked "invalid" or some similar status at a cache is not considered to be "present" at that cache.

Figure 1:
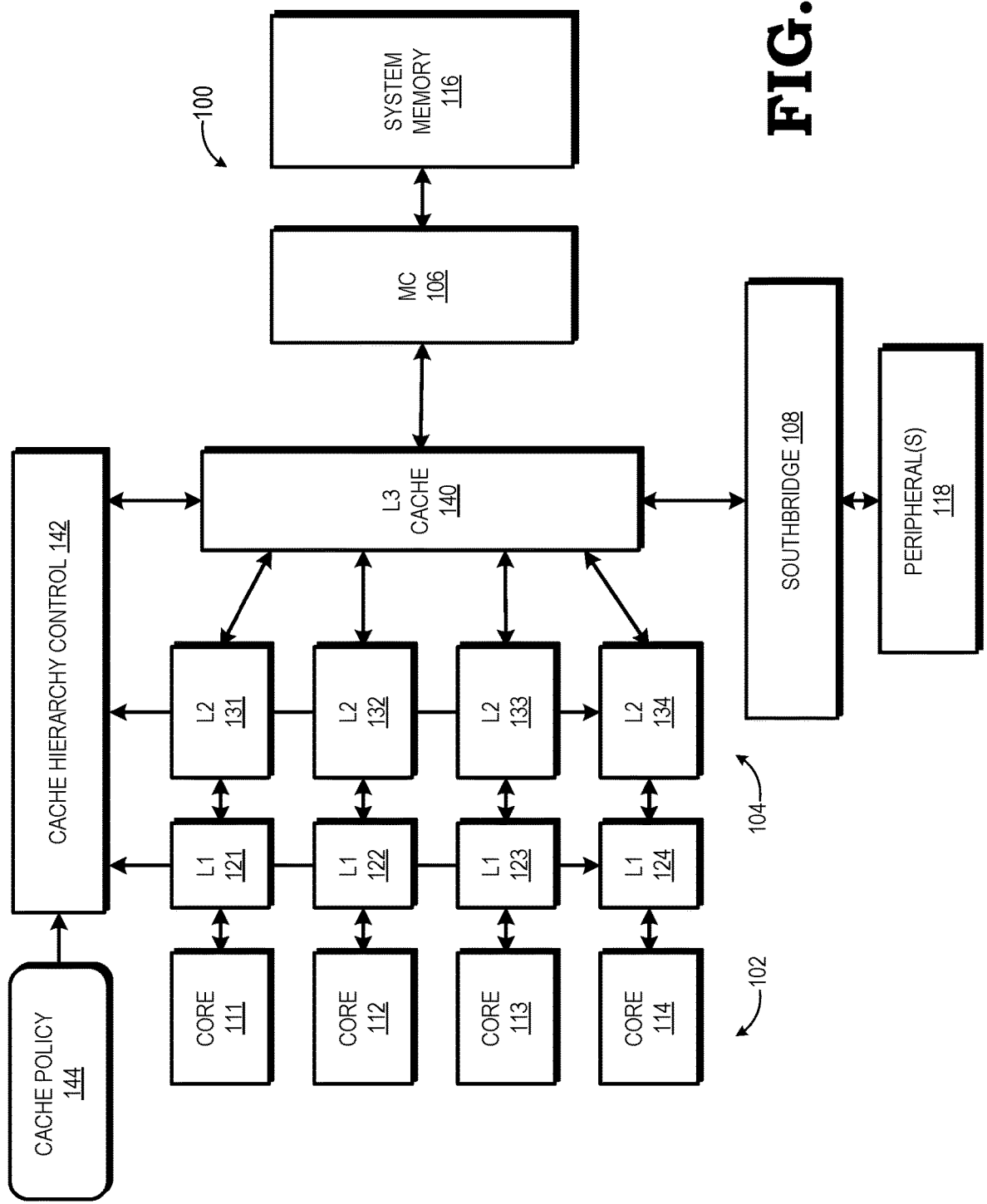
FIG. 1 is a block diagram of a data processing system employing a cache hierarchy with a hybrid lower-level cache inclusion policy in accordance with some embodiments.

FIG. 1 illustrates a processing system 100 using a hybrid lower-level cache inclusion policy in accordance with at least some embodiments. The processing system 100 includes a compute complex 102, a cache hierarchy 104, a memory controller (MC) 106, and a southbridge 108. The compute complex 102 includes one or more processor cores, such as four processor cores 111, 112, 113, 114. The processor cores include, for example, central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104 and a system memory 116. Thus, data to be cached in the cache hierarchy 104 typically is manipulated as blocks of data referred to as "cachelines", and which are addressed or otherwise located in a memory hierarchy using a physical address of system memory 116. Cachelines are accessed from the system memory 116 by the memory controller 106 in response to memory requests from the cache hierarchy 104, and the cachelines are installed, or cached, in one or more caches of the cache hierarchy 104. Likewise, when a cacheline containing modified data is evicted from the cache hierarchy 104, and thus needs to be updated in the system memory 116, the memory controller 106 manages this write-back process. The southbridge 108 operates as the interface between the cache hierarchy 104, the memory controller 106, and one or more peripherals 118 of the processing system 100 (e.g., network interfaces, keyboards, mice, displays, and other input/output devices).

The cache hierarchy 104 includes three or more levels of caches, including a first level (L1), a second level (L2), and a third level (L3) of caches. Although the example embodiment of FIG. 1 includes only three levels, in other embodiments the cache hierarchy 104 includes four or more caching levels. Each caching level includes one or more caches at that level. For system 100, the compute complex 102 implements small private caches for each processing core at L1, implemented as L1 caches 121, 122, 123, 124, each associated with a corresponding one of processor cores 111-114. Further, for L2, the compute complex 102 implements larger private caches for each processor core, implemented as L2 caches 131, 132, 133, 134 corresponding to processor cores 111-114, respectively. Each of the L2 caches 131-134 is private to its corresponding processor core, but the cache hierarchy 104 operates to maintain coherency between the L2 caches 131-134. The L2 caches 131-134 can be direct mapped or an n-way set associative cache in some embodiments. In other embodiments, two or more L1 caches may share a single L2 cache. For the L3 caching level, the cache hierarchy 104 implements an L3 cache 140 that is shared by the processor cores of the compute complex 102, and thus shared by at least the L2 caches 131-134. In other embodiments, the L3 caching level may include more than one L3 cache shared by the L2 caches 131-134 in various combinations.

The caches of the cache hierarchy 104 are used to cache data for access and manipulation by the processor cores 111-114. Typically, caches at lower levels (e.g., L1) tend to have lower storage capacity and lower access latencies, while caches at higher levels (e.g., L3) tend to have higher storage capacity and higher access latencies. Accordingly, cachelines of data are transferred among the caches of different cache levels so as to better optimize the utilization of the cache data in view of the caches' storage capacities and access latencies through cacheline eviction processes and cacheline installation processes managed by cache hierarchy control logic 142 of the cache hierarchy 104. Although depicted using a single block external to the various caches of the cache hierarchy 104 for ease of illustration in FIG. 1, it will be appreciated that in a typical implementation individual components of the cache hierarchy control logic 142 are implemented at each cache as cache control logic for that cache, and thus the cache hierarchy control logic 142 represents the aggregate of the individual cache control logic components implemented at each cache of the cache hierarchy 104. In some embodiments, the logic components of the cache hierarchy control logic 142 are implemented as hard-coded logic on one or more integrated circuit (IC) chips implementing the processing system 100. In other embodiments, some or all of the logic components of the cache hierarchy control logic 142 are implemented as programmable logic, as configurable logic (e.g., fuse-configurable logic), one or more processors executing a program of instructions, or a combination thereof.

In operation, the cache hierarchy control logic 142 installs and evicts (that is, removes) cachelines of data fetched from the system memory 116 in accordance with one or more caching policies defined for the cache hierarchy control logic 142 via hard-coded logic, programmable elements (e.g., fuses), register sets, or a combination thereof. One of these caching policies includes a caching policy 144 for selective eviction of cachelines depending on their presence status in other caching levels, referred to herein as the "hybrid lower-level cache inclusion policy 144". The guidelines for hybrid lower-level cache inclusion policy 144 are be briefly summarized as follows: (1) any cacheline present in a first-level cache (e.g., one of the L1 caches 121-124) must also be present in at least one of a second-level cache (e.g., one of L2 caches 131-134) or a third-level cache (e.g., L3 cache 140); (2) when a cacheline is evicted from a second-level cache, eviction of the cacheline from the first-level cache is not required (that is, if the cacheline is present in the L1 cache, the cacheline will be maintained in the L1 cache even after eviction of the cacheline from the L2 cache); and (3) when a cacheline is evicted from a third-level cache and that cacheline is not present in a second-level cache at the time of eviction, then the cacheline is also evicted from the first-level cache. This particular caching policy improves performance as the first-level cachelines are not required to be evicted when a second-level cache evicts them. While an inclusive third-level (L3) policy could also achieve this, it would be at the cost of decreased capacity in the third-level cache due to the duplicated cachelines.

Figure 2:
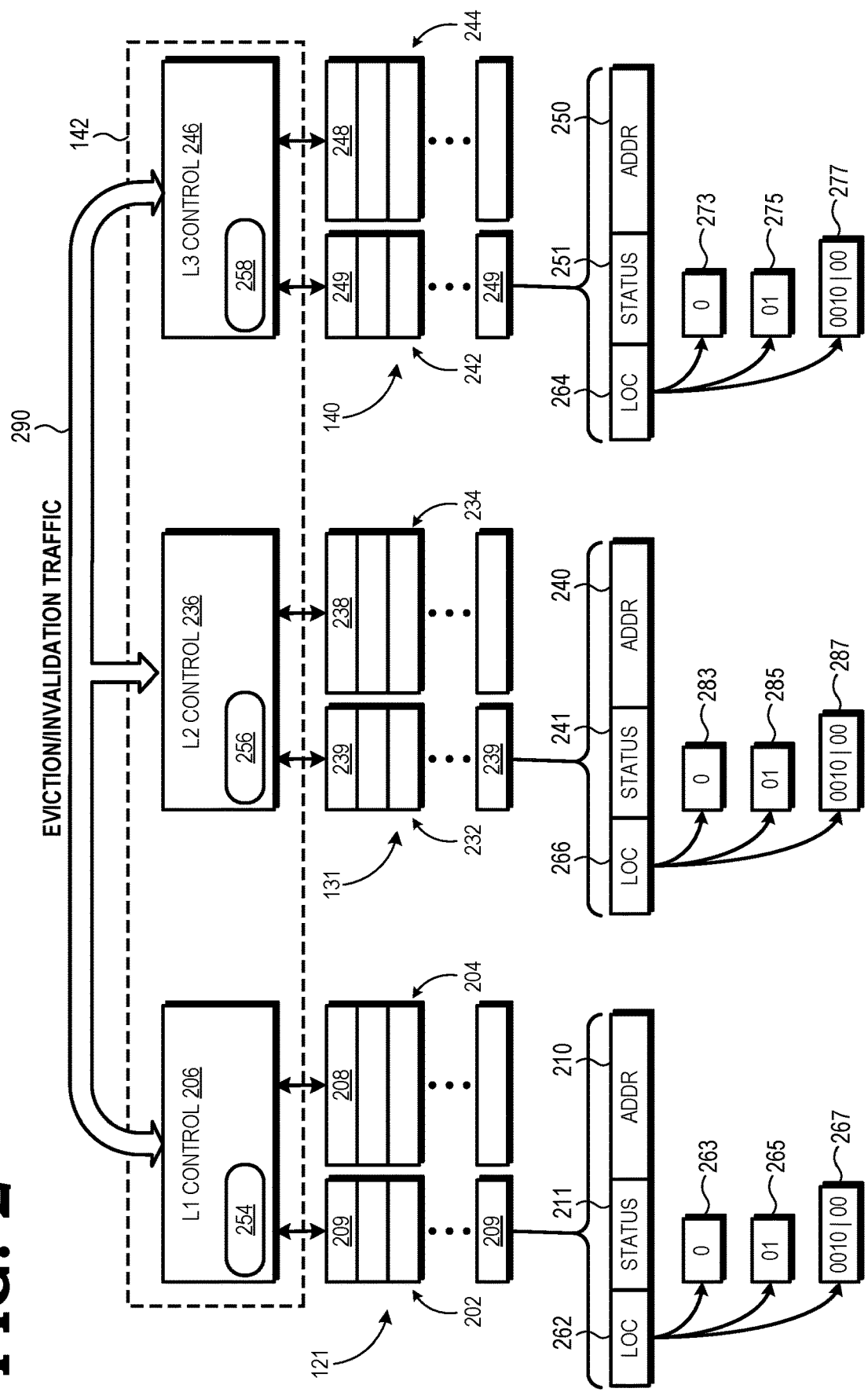
FIG. 2 is a block diagram illustrating the cache hierarchy for the data processing system of FIG. 1 in accordance with some embodiments.

FIG. 2 illustrates an example implementation of the cache hierarchy control logic 142 and the caches from the cache hierarchy 104 in more detail in accordance with some embodiments. As noted above, each of the cache levels has one or more caches within that level. However, for ease of illustration, only a single cache from each cache level is shown in FIG. 2, namely as L1 cache 121, L2 cache 131, and L3 cache 140. It will be understood that the other caches of the cache hierarchy 104 would be similarly configured in the manner described below.

The L1 cache 121 includes a tag array 202, a data array 204, and L1 control logic 206. The data array 204 includes a plurality of data entries 208, or lines, each of which is configured to store a corresponding set of data (that is, "a cacheline") from the system memory 116. The tag array 202 likewise includes a plurality of tag entries 209, each of which is associated with a corresponding data entry 208 of the data array 204 and which is configured to store various information regarding a cacheline stored in the corresponding entry 208, such as the address (or portion thereof) associated with the cacheline in address field 210 and one or more status bits stored in status field 211. The L2 cache 131 and the L3 cache 140 are similarly configured. As such, the L2 cache 131 includes a tag array 232, a data array 234, and L2 control logic 236, and the L3 cache 140 includes a tag array 242, a data array 244, and L3 control logic 246. The data arrays 234, 244 include a plurality of data entries 238, 248, respectively, for storing cachelines of data, and the tag arrays 232, 242 include a plurality of tag entries 239, 249 corresponding to the data entries 238, 248, respectively. As with the tag entries 209, the tag entries 239 have an address field 240 for storing an address of a corresponding cacheline, status field 241 for storing status bits for the corresponding cacheline, and the like. Likewise, the tag entries 249 have an address field 250 and a status field 251 for the corresponding cachelines stored in the data entries 248.

The L1 control logic 206, the L2 control logic 236, and L3 control logic 246 together constitute at least part of the cache hierarchy control logic 142, which as noted above, operates to implement one or more caching policies for the cache hierarchy, including the caching policy 144 (FIG. 1). To this end, each of the control logic 206, 236, 246 includes coherency logic 254, 256, 258, respectively, to implement corresponding aspects of the hybrid lower-level cache inclusion policy 144, as described in greater detail below with reference to FIGS. 3-5. To facilitate this operation, in some embodiments one or more of the caches 121, 131, 140 stores presence information that identifies whether each cacheline stored in the cache is also stored in one or more of the other caches of the cache hierarchy 104. This presence information, in one embodiment, is stored in, or in association with, the tag array of the cache. To illustrate, the tag entries 209 of the tag array 202 of the L1 cache 121 each includes a presence (or location "LOC") field 262 that stores co-presence information for the cacheline with respect to the cacheline's storage in other caches.

To illustrate, in one embodiment the presence field 262 is configured as a single bit field 263 that indicates whether the corresponding cacheline is found in either an L2 cache or an L3 cache. Thus, if the single bit field 263 is set to 0, this indicates that the cacheline in the corresponding data entry 208 of the L1 cache 121 is present in an L2 cache, whereas the single bit field 263 being set to 1 indicates that the cacheline is found in an L3 cache. In other embodiments, the presence field 262 is configured as a two-bit field 265 that indicates whether the corresponding cacheline is found in either an L2 cache or an L3 cache, and also identifies the particular cache level storing the copy of the cacheline. To illustrate, a value of 10 indicates a copy of the cacheline is present in an L2 cache but not present in an L3 cache, a value of 01 indicates a copy of the cacheline is not present in an L2 cache but present in an L3 cache, and a value of 11 indicates both an L2 cache and an L3 cache store a copy of the cacheline. In yet other embodiments, the presence field 262 is implemented as a multiple-bit field 267 that identifies both the lower cache level(s) at which a copy of the cacheline may be found, as well as the particular cache way(s) at each lower cache level storing the cacheline.

The L3 cache 140, in some embodiments, is similarly configured with the tag entries 249 of the tag array 242 having a presence field 264 used to indicate whether the cacheline in the corresponding data entry 238 is present in the higher cache levels. As with the presence field 262, in some embodiments the presence field 264 is configured as a single bit field 273 that simply identifies whether a copy of the cacheline is found in an L1 cache or an L2 cache but does not identify which of the two higher cache levels or the particular cache(s) storing the cacheline. In other embodiments, the presence field 264 is configured as a two-bit field 275 that identifies whether a copy of the cacheline is found in the higher cache levels, as well as identifying the higher cache level(s) containing a copy of the cacheline. In yet other embodiments, the presence field 264 is implemented as a multi-bit field 277 that not only identifies which higher cache level(s) store a copy of the cacheline, but the particular cache(s) as well. The L2 cache 131 likewise may be configured with a presence field 266 in the tag entries 239 or elsewhere in the L2 cache 131 configured as one of a single bit field 283, a two-bit field 285, or a multiple-bit field 287 for identifying the presence of corresponding cachelines in one or both of the L1 cache level and the L3 cache level.

Figure 3:
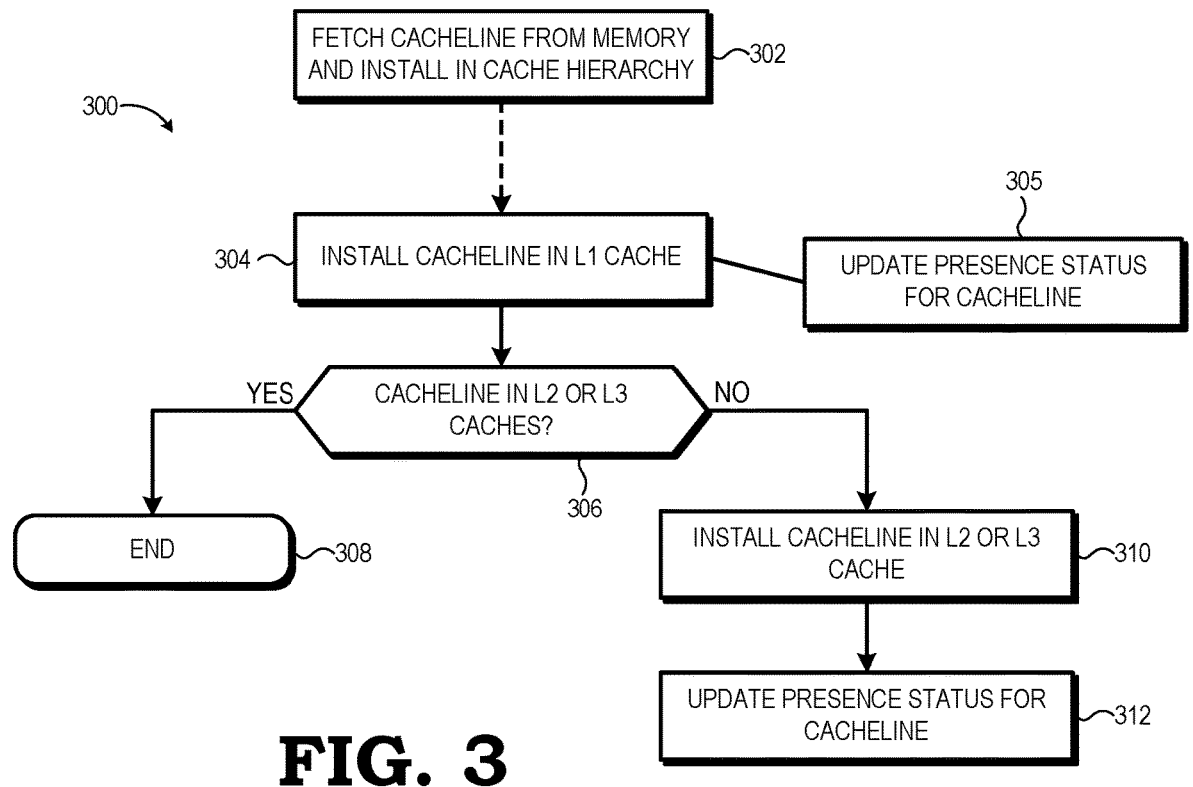
FIG. 3 is a flow diagram illustrating an aspect of the hybrid lower-level cache inclusion policy for installation of a cacheline in a first-level cache of a cache hierarchy of a data processing system in accordance with some embodiments.
Figure 4:
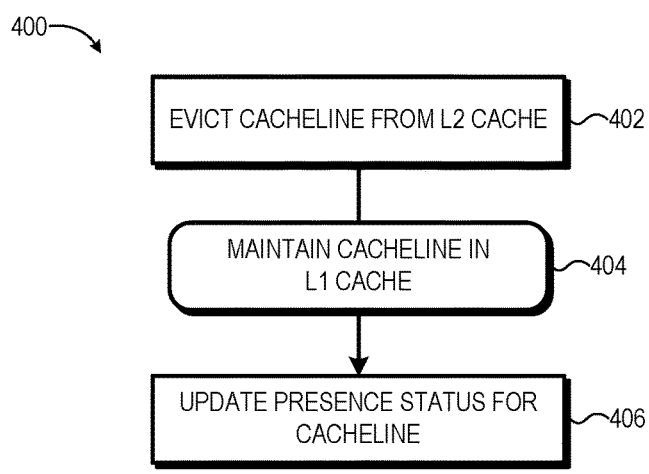
FIG. 4 is a flow diagram illustrating an aspect of the hybrid lower-level cache inclusion policy for eviction of a cacheline from a second-level cache of a cache hierarchy of a data processing system in accordance with some embodiments.
Figure 5:
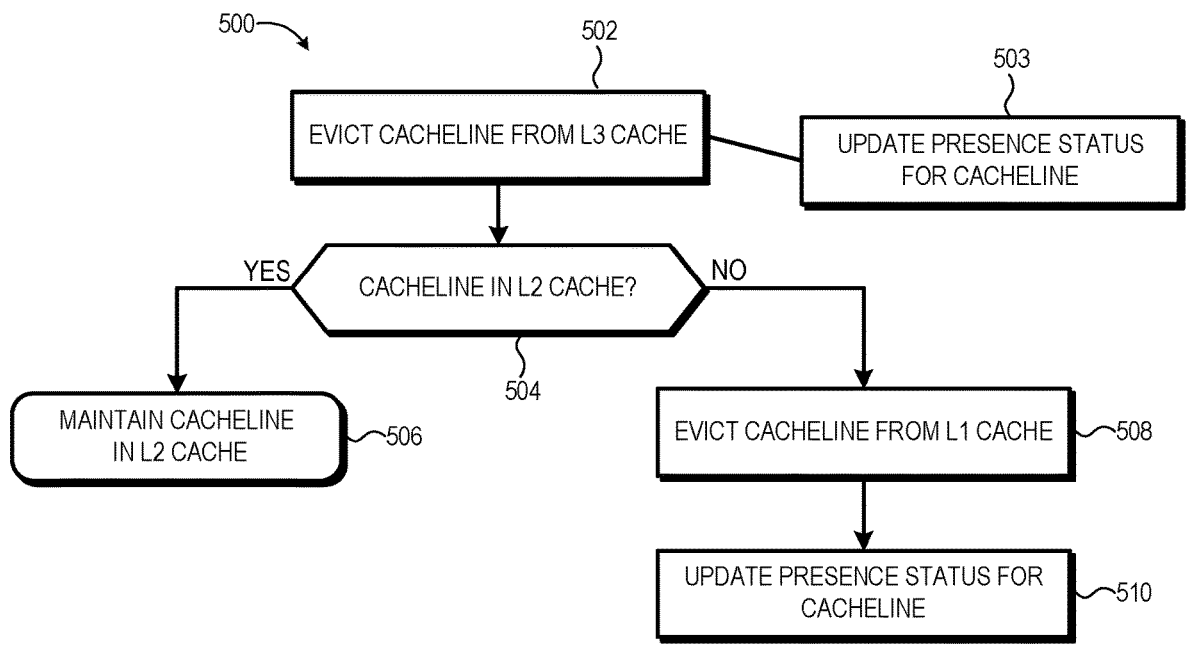
FIG. 5 is a flow diagram illustrating an aspect of the hybrid lower-level cache inclusion policy for eviction of a cacheline from a third-level cache of a cache hierarchy of a data processing system in accordance with some embodiments.

The presence information represented by the presence fields 262, 264, 266 is used by the respective coherency logic 254, 256, 258 to collectively implement the hybrid lower-level cache inclusion policy 144 responsive to installation of a cacheline to a particular cache or responsive to eviction of a cacheline from a cache. To this end, the coherency logic 254, 256, 258 utilize a messaging interconnect 290 to communicate installation messages and eviction messages among the various caches in order to install a copy of a cacheline in a targeted cache or to evict a copy of a cacheline from a targeted cache in accordance with the caching guidelines specified by the caching policy 144. FIGS. 3-5 illustrate example methods of operation for the coherency logic 254, 256, and 258, respectively.

FIG. 3 illustrates a method 300 for implementing a corresponding aspect of the caching policy 144 at an L1 cache, such as L1 cache 121, in accordance with some embodiments. The method 300 initiates at block 302 with the fetching of a cacheline of data from the system memory 116 and installation of the cacheline in the cache hierarchy 104. The cacheline is fetched as a demand fetch responsive to initial execution of an instruction referencing data contained in the cacheline, or the cacheline is fetched from system memory 116 as part of a speculative prefetch operation. Typically, a cacheline fetched from system memory 116 is first installed in a lower-level cache, such as in the L2 cache 131 or the L3 cache 140. At some point, either as the initial fetch of the cacheline from system memory 116 or subsequently as part of a request for data stored in the cacheline by a processor core, a copy of the cacheline is installed in an L1 cache (e.g., L1 cache 131) at block 304.

As part of the initial cacheline installation and as part of the installation of the cacheline into the L1 cache, at block 305 the caches of the cache hierarchy 104 update their respective presence information fields to reflect the presence of the cacheline in one or more caches of the cache hierarchy 104. In one embodiment, location status updates are performed responsive to coherency messages transmitted between the coherence logic of the various caches via the messaging interconnect 290. To illustrate, installation of the cacheline in the L1 cache 131 triggers the coherency logic 254 of the L1 control logic 206 to broadcast a coherency message for that cacheline to the other caches of the cache hierarchy 104 so as to inform the cache hierarchy 104 of installation of the cacheline at the L1 cache 131. In response to receiving this coherency message, the coherency logic 256 of the L2 control logic 236 accesses the tag entry 239 for that cacheline (if stored at the L2 cache 131) and updates the presence field 266 to reflect that a copy of the cacheline is stored at the L1 cache level and if so configured, the particular L1 cache now storing the cacheline. The coherency logic 258 updates the corresponding presence field 264 in a similar manner upon receipt of the coherency message at the L3 cache 140.

Recall that one of the aspects or guidelines of the hybrid lower-level cache inclusion policy 144 is that if a cacheline is stored in an L1 cache, a copy of that cacheline must also be stored in at least one of an L2 cache or an L3 cache. Accordingly, at block 306 the coherency logic (e.g., coherency logic 254) of the L1 cache storing the cacheline checks the presence field 262 for that cacheline to determine whether the cacheline is present in a cache at the L2 or L3 caching level. If so, then the method 300 terminates at block 308 until the next cacheline is installed in the cache hierarchy 104. Otherwise, if the cacheline is not present in an L2 cache or an L3 cache, at block 310 the coherency logic of the L1 cache triggers installation of a copy of the cacheline at a lower-level cache by sending an installation message to a lower-level cache accessible by the L1 cache to instruct that lower-level cache to install a copy of the cacheline. Generally, the next lower-level would be used, and thus, for example, the L1 cache 121 would instruct the L2 cache 131 to install a copy of the cacheline at block 310. As a result of the installation of the copy of the cacheline, at block 312 the lower-level cache receiving and storing the copy of the cacheline broadcasts a coherency message to the other caches so that the other caches update their local presence information stores accordingly.

FIG. 4 illustrates a method 400 for implementing a corresponding aspect of the hybrid lower-level cache inclusion policy 144 at an L2 cache, such as L2 cache 131, in accordance with some embodiments. The method 400 initiates at block 402 with the eviction of a cacheline from the L2 cache. The eviction of the cacheline typically is triggered in response to the data array 234 of the L2 cache being over-subscribed. In a conventional caching policy, eviction of a cacheline from an L2 cache would require eviction of that same cacheline from all L1 caches associated with the L2 cache. However, as explained above, one guideline of the hybrid lower-level cache inclusion policy 144 is that cacheline evictions from the L2 caching level do not require eviction of the same cachelines from the L1 caching level as a consequence. Accordingly, as represented by block 404, the cacheline evicted from the L2 cache at block 402 is maintained in the L1 cache in accordance with the hybrid lower-level cache inclusion policy 144. Further, as a result of the cacheline eviction at the L2 cache, the L2 cache broadcasts a coherency message to the other caches at block 406 to reflect eviction of the cacheline so that the other caches update their local presence information stores accordingly.

FIG. 5 illustrates a method 500 for implementing a corresponding aspect of the hybrid lower-level cache inclusion policy 144 at an L3 cache, such as L3 cache 140, in accordance with some embodiments. The method 500 initiates at block 502 with the L3 cache determining that a cacheline is to be evicted. Accordingly, the L3 control logic (e.g., L3 control logic 246) marks the cacheline as invalid in the status field of the tag entry corresponding to the cacheline and transmits a coherency message to the other caches of the cache hierarchy 104 indicating that the L3 cache has evicted the cacheline. In some implementations, eviction of a cacheline from an L3 cache results in the cacheline, if modified, being provided to the system memory 116 so as to overwrite the original data. Further, at block 503 the other caches of the cache hierarchy 104 update their local location stores in response to the coherency message being transmitted by the L3 cache.

As explained above, one aspect or guideline of the hybrid lower-level cache inclusion policy 144 is that eviction of a cacheline from the L3 cache level requires eviction of the cacheline from the L1 cache level as a result unless that cacheline is also present in an L2 cache. This guideline permits the cache hierarchy 104 to determine on any subsequent accesses to the cacheline that the cacheline is not in the L1 cache strictly by looking in the L2 and L3 caches and without requiring a search of the L1 cache, and thus saving power and improving performance. Accordingly, at block 504, the cache hierarchy 104 determines whether the cacheline evicted from the L3 cache is present in an L2 cache. In some implementations, this is determined by the coherency logic 258 of the L3 control logic 246 of the L3 cache that evicted the cacheline using the presence field 264 of the corresponding tag entry 249 in the L3 cache. In other embodiments, the presence of the evicted cacheline in an L2 cache is collectively determined by the coherency logic 256 of the L2 control logic 236 of the one or more L2 caches of the cache hierarchy using the presence fields 266 of the corresponding tag entries 239 of the L2 caches. In yet other embodiments, the presence of the evicted cacheline in an L2 cache is collectively determined by the coherency logic 254 of the L1 control logic 206 of the one or more L1 caches of the cache hierarchy 104.

If the cacheline is identified to be present in an L2 cache, at block 506 the cacheline is maintained in the L2 cache and the current iteration of method 500 terminates. Otherwise, if no copy of the evicted cacheline is found in the L2 cache level, at block 508 the cache hierarchy 104 evicts the cacheline from the L1 cache level as well. If presence of the evicted cacheline at the L2 cache level was performed by the L1 cache at block 504, then at block 508 the coherency logic 254 of the L1 caches trigger the eviction of the cacheline from their respective data arrays 204. Otherwise, if presence of the evicted cacheline at the L2 cache level was performed at the L2 cache level or the L3 cache level, then a cache at that lower cache level sends an eviction message to the one or more L1 caches of the cache hierarchy 104 via the messaging interconnect 290, in response to which the L1 caches evict the identified cacheline. Further, at block 510, the caches of the cache hierarchy 104 update their local presence information stores in response to the eviction message transmitted in response to the eviction of the copy of the cacheline from the one or more L1 caches so as to reflect that the cacheline is no longer present in the L1 cache level.

In some embodiments, the apparatus and techniques described above are implemented in a system including one or more integrated circuit (IC) devices (also referred to as integrated circuit packages or microchips), such as the system 100 described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A data processing system, comprising:
   one or more processor cores; and
   a cache hierarchy comprising:
     a first-level cache;
     a second-level cache;
     a third-level cache; and
     cache hierarchy control logic configured to implement a caching policy in which each cacheline cached in the first-level cache has a copy of the cacheline cached in at least one of the second-level cache and the third-level cache and in which an eviction of a cacheline from the third-level cache triggers the cache hierarchy control logic to evict a copy of that cacheline from the first-level cache when the copy of the cacheline is not present in the second-level cache.

2. The data processing system of claim 1, wherein:
   the caching policy further provides that an eviction of a cacheline from the second-level cache does not trigger an eviction of a copy of that cacheline from the first-level cache.

3. The data processing system of claim 1, wherein:
   the caching policy further provides that an eviction of a cacheline from the third-level cache triggers the cache hierarchy control logic to:
     maintain the copy of that cacheline in the first-level cache when a copy of that cacheline is present in the second-level cache.

4. The data processing system of claim 3, wherein:
   the third-level cache has access to a first set of presence fields to store first presence information identifying which cachelines in the third-level cache are also stored in either of the first-level cache or the second-level cache.

5. The data processing system of claim 4, wherein the first presence information identifies only whether a corresponding cacheline is in one of the first-level cache or the second-level cache.

6. The data processing system of claim 4, wherein the first presence information identifies whether a corresponding cacheline is in the first-level cache and whether the corresponding cacheline is in the second-level cache.

7. The data processing system of claim 4, wherein:
   the cache hierarchy comprises multiple first-level caches and multiple second-level caches; and
   the first presence information identifies in which first-level cache of the multiple first-level caches or in which second-level cache of the multiple second-level caches a corresponding cacheline is stored.

8. The data processing system of claim 4, wherein the first set of presence fields is part of a tag array of the third-level cache.

9. The data processing system of claim 4, wherein:
   the first-level cache has access to a second set of presence fields to store second presence information identifying which cachelines in the first-level cache are also stored in either of the second-level cache or the third-level cache.

10. The data processing system of claim 9, wherein the second presence information identifies only whether a corresponding cacheline is in one of the second-level cache or the third-level cache.

11. The data processing system of claim 9, wherein the second presence information identifies whether a corresponding cacheline is in the second-level cache and whether the corresponding cacheline is in the third-level cache.

12. The data processing system of claim 9, wherein:
    the cache hierarchy comprises multiple second-level caches; and
    the second presence information identifies in which second-level cache of the multiple second-level caches a corresponding cacheline is stored.

13. The data processing system of claim 9, wherein the second set of presence fields are part of a tag array of the first-level cache.

14. A method, comprising:
    fetching a cacheline from memory;
    storing, by cache hierarchy control logic of a cache hierarchy, the cacheline in a first-level cache of the cache hierarchy;
    storing, by the cache hierarchy control logic, the cacheline in a second-level cache responsive to a caching policy in which every cacheline in the first-level cache is also stored in at least one of the second-level cache or a third-level cache of the cache hierarchy;
    evicting, by the cache hierarchy control logic, the cacheline from the second-level cache while maintaining the cacheline in the first-level cache;
    evicting, by the cache hierarchy control logic, the cacheline from the third-level cache;
    determining, by the cache hierarchy control logic, whether the cacheline is present in the second-level cache; and
    evicting, by the cache hierarchy control logic in accordance with the caching policy, the cacheline from the first-level cache responsive to the eviction of the cacheline from the third-level cache and responsive to determining the cacheline is not present in the second-level cache, wherein:

evicting the cacheline from the second-level cache comprises one of:

storing the cacheline in the third-level cache; or updating the memory with a modified value of the cacheline.

15. The method of claim 14, wherein:

storing, by the cache hierarchy control logic, the cacheline in the second-level cache comprises:

determining, by the cache hierarchy control logic, that neither the first-level cache nor the second-level cache presently stores the cacheline based on presence information stored at the first-level cache, the presence information identifying, for each cacheline stored in the first-level cache, whether that cacheline is also stored in at least one of the second-level cache or the third-level cache.

16. The method of claim 15, wherein the presence information identifies whether the cacheline is stored at the second-level cache or stored at the third-level cache.

17. The method of claim 16, wherein:

the cache hierarchy comprises multiple second-level caches; and the presence information identifies a particular second-level cache of the multiple second-level caches that stores the cacheline.

18. The method of claim 14, wherein:

evicting the cacheline from the second-level cache comprises one of:

storing the cacheline in the third-level cache; or updating the memory with a modified value of the cacheline.

19. The method of claim 14, wherein:

determining whether the cacheline is present in the second-level cache is based on presence information stored at the third-level cache, the presence information indicating whether, for each cacheline stored in the third-level cache, the cacheline is also present in the second-level cache.

20. The method of claim 19, wherein:

the cache hierarchy comprises multiple second-level caches; and the presence information identifies a particular second-level cache of the multiple second-level caches that stores the cacheline.

21. A method, comprising:

fetching cachelines from memory;

caching the cachelines in a cache hierarchy in accordance with a caching policy, the cache hierarchy having a first-level cache, a second-level cache, and a third-level cache; and wherein the caching policy provides that any cacheline cached in the first-level cache also is stored in at least one of the second-level cache or the third-level cache, that an eviction of a cacheline from the second-level cache does not require eviction of that cacheline from the first-level cache, and that eviction of a cacheline from the third-level cache also evicts that cacheline from the first-level cache unless that cacheline is also cached in the second-level cache.

22. The method of claim 21, wherein cache hierarchy control logic implements the caching policy using presence information stored at one or more of the first-level cache, the second-level cache, or the third-level cache, the presence information at a cache of a given cache level indicating whether a cacheline stored at a cache of the given cache level is stored at one or more other cache levels of the cache.

* * * * *